US008667270B2

(12) United States Patent
Brutch et al.

(10) Patent No.: US 8,667,270 B2
(45) Date of Patent: Mar. 4, 2014

(54) SECURELY UPGRADING OR DOWNGRADING PLATFORM COMPONENTS (75) Inventors: Tasneem Brutch, Lincoln, CA (US); Onur Aciicmez, Santa Clara, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 33 days.

(21) Appl. No.: 13/371,195

(22) Filed: Feb. 10, 2012

(65) Prior Publication Data
US 2013/0212380 A1  Aug. 15, 2013

(51) Int. Cl.
*H04L 29/06* (2006.01)
*H04L 9/32* (2006.01)
*G06F 9/44* (2006.01)
*G06F 9/445* (2006.01)

(52) U.S. Cl.
CPC ...... *H04L 63/0823* (2013.01); *H04L 29/06816* (2013.01); *H04L 29/06775* (2013.01); *G06F 8/65* (2013.01)
USPC ........... 713/156; 713/155; 713/168; 713/169; 713/170; 713/171; 717/168; 717/171

(58) Field of Classification Search
USPC .......... 713/155, 156, 168–171; 717/168–173; 709/203, 219–222
See application file for complete search history.

(56) References Cited

U.S. PATENT DOCUMENTS

| 6,292,874 | B1 | 9/2001 | Barnett | |
| 6,952,767 | B1 * | 10/2005 | Tanaka | 713/100 |
| 7,124,274 | B2 | 10/2006 | Watt et al. | |
| 7,412,579 | B2 | 8/2008 | O'Connor et al. | |
| 7,502,946 | B2 * | 3/2009 | Perkins et al. | 713/193 |
| 7,522,732 | B2 * | 4/2009 | Whitehead | 380/286 |
| 7,565,537 | B2 | 7/2009 | Morais et al. | |
| 7,647,501 | B2 * | 1/2010 | Imai | 713/175 |
| 7,698,555 | B2 * | 4/2010 | Jiang et al. | 713/168 |
| 7,711,960 | B2 | 5/2010 | Scarlata | |
| 7,844,963 | B2 * | 11/2010 | Pitzel et al. | 717/171 |
| 7,984,485 | B1 * | 7/2011 | Rao et al. | 726/3 |
| 8,375,380 | B2 | 2/2013 | Shahidzadeh et al. | |
| 2001/0049787 | A1 * | 12/2001 | Morikawa et al. | 713/156 |
| 2003/0191823 | A1 * | 10/2003 | Bansal et al. | 709/220 |

(Continued)

FOREIGN PATENT DOCUMENTS

EP   2378454 A1   10/2011
WO   2006127949 A1   11/2006

OTHER PUBLICATIONS

Santosh Cokhani "Toward a National Public Key Infrastructure", IEEE Communications Magazine, Sep. 1994, pp. 70-74.*

(Continued)

*Primary Examiner* — Catherine Thiaw
(74) *Attorney, Agent, or Firm* — Kenneth L. Sherman, Esq.; Michael Zarrabian, Esq.; Sherman & Zarrabian LLP (57) ABSTRACT A method for securely altering a platform component is provided, comprising: assigning certificates for public encryption and signature verification keys for the device; assigning certificates for public encryption and signature verification keys for an upgrade server; mutually authenticating a device containing the platform component and the upgrade server; causing the device and the upgrade server to exchange a session key; and providing an alteration to be made to the platform component from the upgrade server to the device using the session key.

24 Claims, 3 Drawing Sheets

(56) References Cited

U.S. PATENT DOCUMENTS

| | | | |
|---|---|---|---|
| 2004/0153672 | A1 | 8/2004 | Watt et al. |
| 2004/0158727 | A1 | 8/2004 | Watt et al. |
| 2004/0233897 | A1 | 11/2004 | Yamaguchi et al. |
| 2005/0010725 | A1 | 1/2005 | Eilert |
| 2005/0044363 | A1 | 2/2005 | Zimmer et al. |
| 2005/0172144 | A1 | 8/2005 | Shao |
| 2005/0204353 | A1* | 9/2005 | Ji ................................. 717/168 |
| 2007/0006213 | A1 | 1/2007 | Shahidzadeh et al. |
| 2007/0107067 | A1 | 5/2007 | Fountian |
| 2008/0052698 | A1* | 2/2008 | Olson et al. ................... 717/168 |
| 2008/0060055 | A1* | 3/2008 | Lau ................................. 726/3 |
| 2008/0155271 | A1* | 6/2008 | Barck et al. ................... 713/189 |
| 2008/0162947 | A1* | 7/2008 | Holtzman et al. ............ 713/193 |
| 2009/0282157 | A1* | 11/2009 | Le et al. ........................ 709/230 |
| 2009/0292926 | A1* | 11/2009 | Daskalopoulos et al. .... 713/176 |
| 2009/0327727 | A1* | 12/2009 | Meijer et al. ................. 713/170 |
| 2010/0310076 | A1* | 12/2010 | Barzilai et al. ................ 380/278 |
| 2010/0311391 | A1* | 12/2010 | Siu et al. ........................ 455/411 |
| 2011/0010543 | A1* | 1/2011 | Schmidt et al. ............... 713/168 |
| 2011/0314462 | A1* | 12/2011 | Clark et al. ................... 717/169 |
| 2012/0023334 | A1 | 1/2012 | Brickell et al. |
| 2012/0047366 | A1* | 2/2012 | Yoo ................................ 713/171 |
| 2012/0137129 | A1* | 5/2012 | Busser et al. ................. 713/156 |
| 2012/0284518 | A1* | 11/2012 | Walker et al. ................. 713/171 |
| 2012/0303952 | A1* | 11/2012 | Smith et al. ................... 713/158 |

OTHER PUBLICATIONS

Kursawe et al., "*Reconfigurable Physical Unclonable Functions—Enabling Technology for Tamper-Resistant Storage*," 2009 IEEE International Workshop on Hardware Oriented Security and Trust (2009) pp. 22-29.

Pappu, "*Physical One-Way Functions*," Ph.D. dissertation, MIT, 2001, 154 pages.

Pappu et al., "*Physical One-Way Functions*," Science, vol. 297, pp. 2026-2030, Sep. 20, 2002.

"[*MS-WUSP*]*: Windows Update Services: Client-Server Protocol Specification*", Microsoft Corporation, Dec. 14, 2011.

"*ARM Security Technology, Building a Secure Systems using TrustZone® Technology*," Copyright © 2005-2009 ARM Limited, URL: http://infocenter.arm.com/help/index.jsp?topic=/com.arm.doc.prd29-genc-009492c/index.html.

Vishnu Valentino, "*15 Step to Hacking Windows Using Evilgrade 2.0 on Backtrack 5*," URL: http://vishnuvalentino.com/computer/15-step-to-hacking-windows-using-evilgrade-2-0-on-backtrack-5/, 2010, 13 pages.

International Search Report dated May 16, 2013 for International Application No. PCT/KR2013/001013 from Korean Intellectual Property Office, pp. 1-3, Seo-gu, Daejeon, Republic of Korea.

European Search Report dated May 22, 2013 for European Application No. 13154592.3 from European Patent Office, pp. 1-9, Munich, Germany.

\* cited by examiner

SECURELY UPGRADING OR DOWNGRADING PLATFORM COMPONENTS

BACKGROUND OF THE INVENTION

1. Field of the Invention

The present invention relates generally to electronic platform components. More specifically, the present invention relates to securely upgrading or downgrading platform components.

2. Description of the Related Art

Electronic component platforms include electronic devices that include multiple levels of components or functionality. These components can either be built into the individual platform by the same manufacturer as the platform, or the components can be built by different manufacturers and later combined into a platform. An example of the former may be a computer processor, which can contain different layers of functionality (e.g., main processing components, multiple cores, built-in memory, graphics acceleration, mathematical calculation acceleration, etc.). An example of the latter may be a computer system, where a company such as Dell™ may assemble a computer using components from various manufacturers.

Consumers purchase such electronic platforms once and cannot upgrade individual components at there will unless they buy a new component and replace an existing one. In some cases, it may even be impossible for the consumer to upgrade an individual component without replacing the entire platform. In the case of a computer processor, for example, it is not possible for a consumer to purchase an upgrade to the built-in memory without either replacing the entire computer processor or using a different component entirely (such as a memory slot built into a separate motherboard). This creates a problem for customers who wish to upgrade some portions of their components but not others. This also creates a problem for manufacturers, who have customers who are willing to pay for certain upgrades but are unable to deliver such upgrades without requiring the customers to purchase additional, unwanted, components or portions of components, which generally results in lost sales.

What is needed is a solution that addresses these issues.

SUMMARY OF THE INVENTION

In a first embodiment of the present invention, a method for securely altering a platform component is provided, comprising: assigning certificates for public encryption and signature verification keys for the device; assigning certificates for public encryption and signature verification keys for an upgrade server; mutually authenticating a device containing the platform component and the upgrade server; causing the device and the upgrade server to exchange a session key during the mutual authenticating; and providing an alteration to be made to the platform component from the upgrade server to the device using the session key exchanged during the mutual authenticating.

In a second embodiment of the present invention, a method for securely altering a platform component is provided, comprising: generating encryption and digital signature key pairs by an upgrade manager on behalf of a device containing the platform component being altered; obtaining public encryption and signature verification keys of a provisioning server from a certification authority; mutually authenticating the device and the provisioning server using the public encryption and signature verification keys; contacting, by the upgrade manager, the certification authority for assigned certificates for public encryption and signature verification keys for the device; contacting, by the upgrade manager, the certification authority for assigned certificates for public encryption and signature verification keys for an upgrade server; sending an alteration request from the upgrade manager to the upgrade server, causing the upgrade server to obtain the upgrade manager's certificates for public encryption and signature verification keys from the certification authority; mutually authenticating the device and the upgrade server; causing the device and the upgrade server to exchange a session key; and providing an secure alteration to be made to the platform component from the upgrade server to the device via the upgrade manager using the session key.

In a third embodiment of the present invention, a system is provided comprising: a device containing a platform component; an upgrade manager; a certification authority; a provisioning server; and an upgrade server; wherein the upgrade manager is designed to generate encryption and digital signature key pairs by an upgrade manager on behalf of a device containing the platform component being altered; obtain public encryption and signature verification keys of a provisioning server from a certification authority; perform one side of mutual authentication between the device and the provisioning server using the public encryption and signature verification keys of the provisioning server; contact the certification authority for assigned certificates for public encryption and signature verification keys for the device; contact the certification authority for assigned certificates for public encryption and signature verification keys for an upgrade server; send an alteration request from the upgrade manager to the upgrade server, causing the upgrade server to obtain the upgrade manager's certificates for public encryption and signature verification keys from the certification authority; perform one side of mutual authentication between the device and the upgrade server; send a session key to the upgrade server; and receive an alteration to be made to the platform component from the upgrade server to the device using the session key; wherein the certification authority is designed to: provide the encryption and signature verification keys of the provisioning server to the upgrade manager; assign certificates for the device's public encryption and signature verification keys; and assign certificates for the upgrade server's public encryption and signature verification keys; wherein the provisioning server is designed to: perform the other side of mutual authentication between the device and the provisioning server using the public encryption and signature verification keys of the provisioning server; and verify the device's information; and wherein the upgrade server is designed to: obtain the upgrade manager's certificates for public encryption and signature verification keys from the certification authority; perform the other side of mutual authentication between the device and the upgrade server using the upgrade server's pubic encryption and signature verification keys; exchange the session key with the upgrade manager; and send the alteration to be made to the platform component to the upgrade manager using the session key.

In a fourth embodiment of the present invention, a system for securely altering a platform component is provided, comprising: means for generating encryption and digital signature key pairs by an upgrade manager on behalf of a device containing the platform component being altered; means for obtaining public encryption and signature verification keys of a provisioning server from a certification authority; means for mutually authenticating the device and the provisioning server using the public encryption and signature verification keys; means for contacting, by the upgrade manager, the certification authority for assigned certificates for public encryption and signature verification keys for the device; means for contacting, by the upgrade manager, the certification authority for assigned certificates for public encryption and signature verification keys for an upgrade server; means for sending an alteration request from the upgrade manager to the upgrade server, causing the upgrade server to obtain the upgrade manager's certificates for public encryption and signature verification keys from the certification authority; means for mutually authenticating the device and the upgrade server; means for causing the device and the upgrade server to exchange a session key; and means for providing an secure alteration to be made to the platform component from the upgrade server to the device via the upgrade manager using the session key.

In a fifth embodiment of the present invention, a program storage device readable by a machine tangibly embodying a program of instructions executable by the machine to perform a method for securely altering a platform component is provided, the method comprising: generating encryption and digital signature key pairs by an upgrade manager on behalf of a device containing the platform component being altered; obtaining public encryption and signature verification keys of a provisioning server from a certification authority; mutually authenticating the device and the provisioning server using the public encryption and signature verification keys; contacting, by the upgrade manager, the certification authority for assigned certificates for public encryption and signature verification keys for the device; contacting, by the upgrade manager, the certification authority for assigned certificates for public encryption and signature verification keys for an upgrade server; sending an alteration request from the upgrade manager to the upgrade server, causing the upgrade server to obtain the upgrade manager's certificates for public encryption and signature verification keys from the certification authority; mutually authenticating the device and the upgrade server; causing the device and the upgrade server to exchange a session key; and providing an secure alteration to be made to the platform component from the upgrade server to the device via the upgrade manager using the session key.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, a mechanism is provided for secure registration and provisioning of a component of an electronic component platform. A mutual authentication protocol is then defined to mutually authenticate the component and a provisioning server. A manufacturer can build into the component certain features which are not enabled when originally sold. A customer can then elect to later upgrade the component by using the secure mutual authentication. A similar mechanism can be used for the manufacturer to "push" certain upgrades, such as software upgrades, patches, or fixes, to the electronic component platform in a secure manner.

The secure and fault tolerant mechanism allows for on-demand, in-field, component upgrades. It utilizes a secure partition and privileged domain(s) to execute sensitive code, to establish secure communication channels, and to handle authentication and updates in a secure and reliable fashion. An embodiment of the present invention may be applied to different processor based platforms, including, but not limited to, platforms with ARM processors, Samsung™ Reconfigurable Processors (SRPs), and x86 processors. Of course, the present invention is not limited to application only on processor based platforms, and can generally be applied to any electronic component platform.

Figure 1:
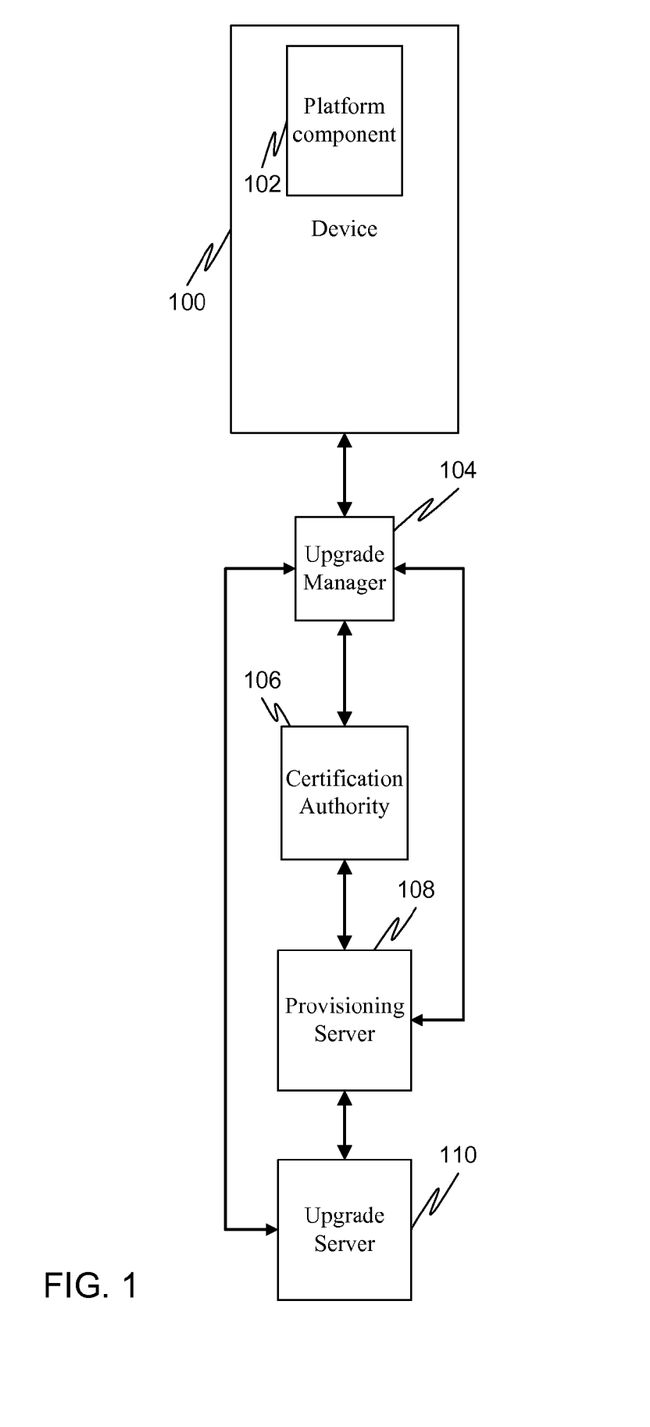
FIG. 1 is a block diagram illustrating a system for securely upgrading a platform component in accordance with an embodiment of the present invention.

FIG. 1 is a block diagram illustrating a system for securely upgrading a platform component in accordance with an embodiment of the present invention. A device 100 contains a platform component 102 to be upgraded. An upgrade manager 104 is utilized to coordinate this upgrade. It should be noted that while this figure depicts upgrade manager 104 as being on a separate device than device 100, in some embodiments the upgrade manager 104 may be located on device 100. An example of the former may be where the platform component is contained on a mobile device and the corresponding upgrade manager is located on a desktop device to which the mobile device synchronizes. An example of the latter may be where the platform component and the upgrade manager are both located on a desktop device.

A certification authority 106 may represent an outside authority by which mutual authentication certificates can be authorized. In one example, it is operated by the device's manufacturer. A provisioning server 108 is then used to verify device information. Finally, an upgrade server 110 contains the upgrade itself and, once mutual authentication is established between the upgrade server 110 and the device 100 (or upgrade manager 104), then the upgrade is transmitted to the device 100 (or upgrade manager 104).

Figure 2:
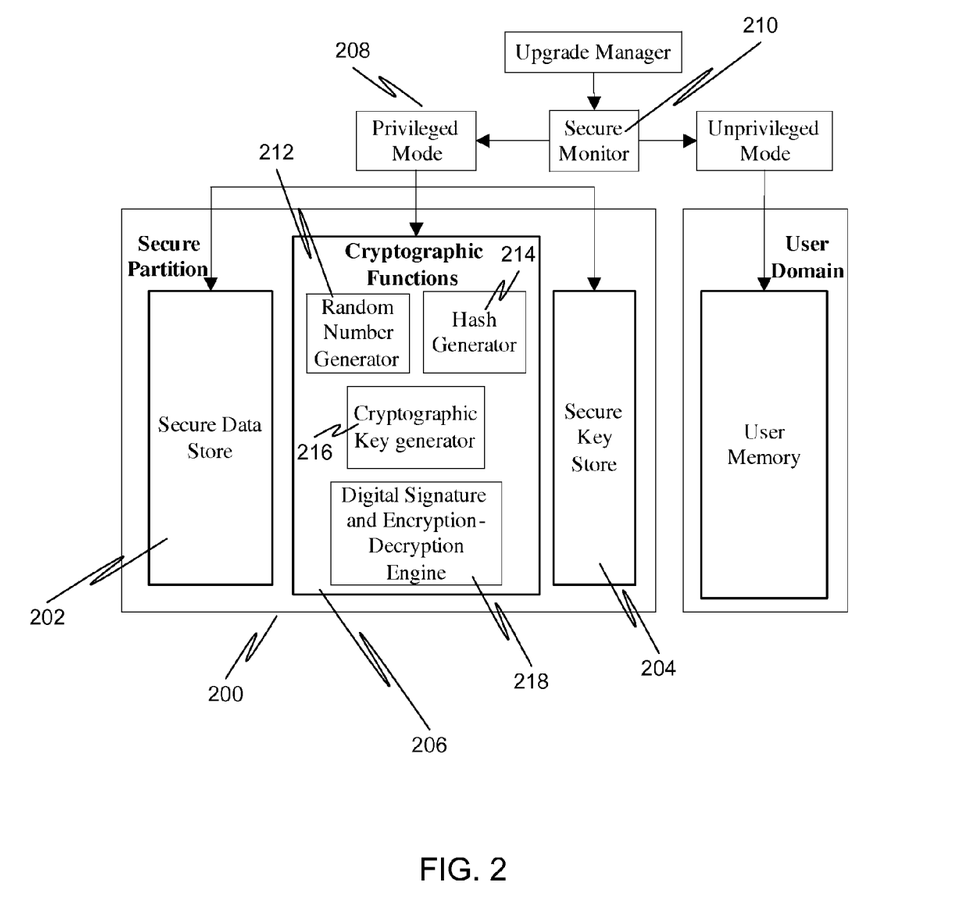
FIG. 2 is a diagram illustrating basic features of secure execution domains leveraged to support secure component upgrade in accordance with an embodiment of the present invention.

FIG. 2 is a diagram illustrating basic features of secure execution domains leveraged to support secure component upgrade in accordance with an embodiment of the present invention. A secure provisioning and mutual authentication mechanism is provided between an upgrade manager (on behalf of the component being upgraded) and a provisioning server/online upgrade server. A secure partition 200 is used to support the secure upgrade. The secure partition 200 provides a secure data store 202, a secure key store 204, and native cryptographic functions 206, which are only accessible from the secure monitor in a privileged mode 208 (through a secure monitor 210). The secure key store 204 is used to store cryptographic keys, a platform id, and secrets associated with provisioning, authenticating, and ensuring data integrity and confidentiality. Access to keying material requires correct authorization.

The secure data store 202 is provided for storing downloaded software (and for software backup, to allow for rollback if needed). Native cryptographic functions 206 residing in the secure domain 200 are only accessible through a secure interface. Available functions include a random number generator 212, a hash generator 214, a cryptographic key generator 216, and a digital signature and encryption-decryption engine 218.

The present invention further allows for entirely new business models for manufacturers and vendors. With this secure system, it becomes possible for manufacturers to remotely upgrade a user's components, thus allowing the manufacturer to charge for more features as the user becomes more and more familiar (and perhaps reliant) on the component. Furthermore, a new type of hardware subscription business model may be introduced, where rather than (or in addition to) an upfront cost for hardware, firmware, and/or software purchases, the user pays a monthly fee (and/or a one-time cost) for a particular level of performance and/or enabling of certain components. Different levels of service may be provided based upon the amount the user is willing to pay. For example, a user needing full access to all components and the highest speed for a processor may pay to have a "gold" subscription, whereas a user who perhaps does not need as much speed or access to all of the components may subscribe to a "silver" subscription.

In an embodiment of the present invention, a certification authority (CA) infrastructure is available for management and distribution of public encryption and signature verification keys. Each device may have its own device identification associated with it, for identification. The CA establishes trust between the entities in the system. The CA verifies the identity of the claimant, and issues a public key certificate, establishing an association between the identity of the claimant (e.g., upgrade manager, registration server, upgrade server) and the value of its public key. The upgrade manager then registers the device or component to be upgraded with the CA.

For registration and provisioning, the upgrade manager acquires copies of the provisioning server's public encryption and signature keys from a mutually trusted certification authority. The upgrade manager then generates its key pairs for encryption/decryption and digital signatures, using the platform's cryptographic functions. The upgrade manager's private encryption and digital signature keys may be stored in the platform's secure key store. The upgrade manager, on behalf of the device or component being upgraded, provides a copy of the public encryption and digital signature keys to a mutually trusted certification authority. The upgrade manager registers the identity (e.g., device identification) of the component being upgraded, and configuration information, with the provisioning server. Upon successful registration, the provisioning server can send a registration identification to the upgrade manager, which is used during mutual authentication between the upgrade server and the upgrade manager as an alias.

Mutual authentication allows systems to protect themselves against fraudulent accesses, and to link resource usage with identified entities. It helps enforce accountability, access control, and non-repudiation. This helps alleviate some of the security issues related to component update servers that only unilaterally authenticate the customer. For example, many operating systems allow for the remote updating of their software via the Internet. An installed version of the operating system identifies itself to an update server, which authenticates the software and then updates the operating system accordingly. However, since the server can tell the client to install binary files, such a system is vulnerable to a man-in-the-middle attack, where a spoof server can tell the client to install compromising binaries. For example, the user may be fooled into attempting to update their operating system software from a malicious website, thinking that it is the real software developer. In such instances, identification of the client alone is no sufficient.

Additionally, such systems are also vulnerable to a denial-of-service attack, where a rogue client can send requests requiring large processing time on the server to the server, such as by passing an unbounded set of parameters. The present invention helps alleviate these security concerns by providing for entity authentication and data origin authentication, using public key encryption and digital signatures. Entity authentication and data origin authentication is performed between the platform's upgrade manager and the upgrade server. Public key encryption is used to mutually authenticate the device's upgrade manager and upgrade server.

Communication confidentiality and data integrity are guaranteed by using a symmetric session key established during the mutual authentication phase between the upgrade manager/device and the upgrade server, to maintain authenticity of claimants during communication. The session key is stored in the platform's secure key store, and is used to decrypt the downloaded software on the platform. Data integrity and non-repudiation of origin are provided by using digital signatures.

Domain separation is established by using a registration identification as an alias for the device to be upgraded.

A signed and encrypted copy of any new software is downloaded to the secure data store. The digital signature of the downloaded software is verified, using the signature verification key. It should be noted that the term "software" shall be interpreted broadly to include software intended to upgrade or patch other software, as well as software intended to upgrade or patch hardware (e.g., "firmware"). The key is stored in the secure key store. A signed copy of the software being upgrade from can be stored in the secure data store, or in another secure partition, to allow for upgrade rollback. The downloaded software is decrypted using the session key and is verified. This key is stored in the secure key store, during mutual authentication between the device's upgrade manager and the upgrade server. The component or device is then upgraded using the downloaded software. In case of an error, the user can rollback to the original software.

Figure 3:
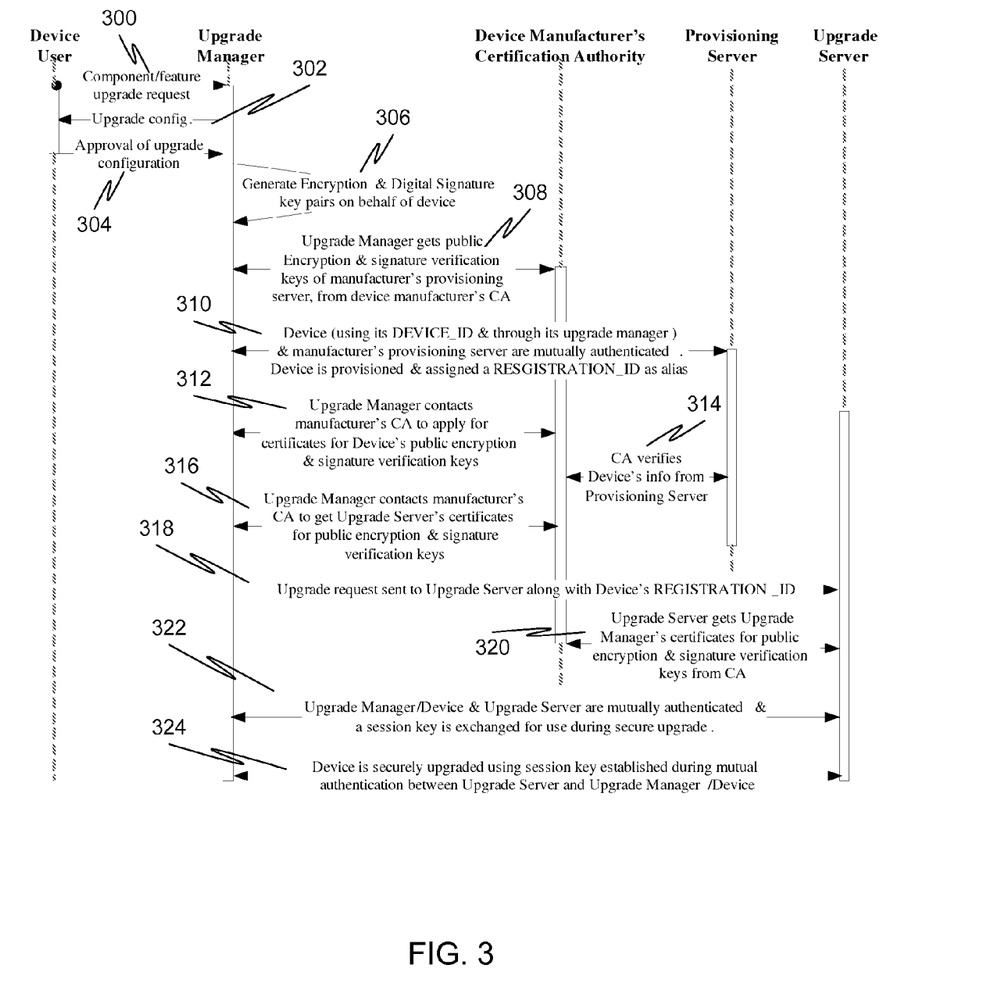
FIG. 3 is a sequence diagram illustrating various steps of device provisioning and upgrade in accordance with an embodiment of the present invention.

FIG. 3 is a sequence diagram illustrating various steps of device provisioning and upgrade in accordance with an embodiment of the present invention. At 300, the device user requests a component or feature upgrade from the upgrade manager. At 302, the upgrade manager sends a configuration of the upgrade to the user for approval. At 304, the user approves the upgrade configuration.

At 306, the upgrade manager generates encryption and digital signature key pairs on behalf of the device. At 308, the upgrade manager gets public encryption and signature verification keys of a manufacturer's provisioning server from the device manufacturer's certification authority. At 310, the device, using its device identification and through its upgrade manager and the manufacturer's provisioning server are mutually authenticated. The device is provisioned and assigned a registration identification as an alias. At 312, the upgrade manager contacts the manufacturer's certification authority to apply for certificates for the device's public encryption and signature verification keys. At 314, the certification authority verifies the device's information from the provisioning server. At 316, the upgrade manager contacts the manufacturer's certification authority to get the upgrade server's certificates for public encryption and signature verification keys.

At 318, an upgrade request is sent from the upgrade manager to the upgrade server along with the device's registration identification. At 320, the upgrade server gets the upgrade manager's certificates for public encryption and signature verification keys from the certification authority. At 322, the upgrade manager/device and the upgrade server are mutually authenticated and a session key is exchanged for use during the secure upgrade. At 324, the device is securely upgraded using the session key established during mutual authentication between the upgrade server and the upgrade manager/device.

It should be noted that while the above embodiments describe mutual authentication used to securely upgrade a component or device, a similar mechanism can be used to securely downgrade a component or device. For example, a user having the aforementioned "gold" membership plan may downgrade service to a "silver" level if he or she determines that the extra processing power or functionality is not needed.

The present invention enables platform component upgrades to occur in the field, and under the control of the platform and the component manufacturers. This may include activation or deactivation of individual cores in a multi-core CPU or GPU in the field, as well as activation, deactivation, or configuration of features and technologies in platform components (such as hyperthreading, virtualization, remote management, etc.) after initial sale of the device.

The present invention also enables development of new business models where platform and component manufacturers can generate a stream of revenue from the same hardware component across the duration of a user's ownership of a platform, after the initial sale. The secure, on-demand, in-field upgrade of devices allows for such a continued revenue stream.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for securely altering a platform component, comprising:
   generating, by an upgrade manager associated with a device, encryption and digital signature key pairs for the device, wherein the device comprises the platform component;
   obtaining public encryption and signature verification keys for a provisioning server from a certification authority;
   mutually authenticating the device and the provisioning server using the public encryption and signature verification keys for the provisioning server and the device, wherein the provisioning server generates a registration identification associated with the device;
   assigning, by the certification authority, certificates for public encryption and signature verification keys for the device;
   assigning, by the certification authority, certificates for public encryption and signature verification keys for an upgrade server, wherein the upgrade server comprises an alteration for the platform component;
   sending an alteration request from the upgrade manager to the upgrade server, causing the upgrade server to obtain assigned certificates for public encryption and signature verification keys for the upgrade manager from the certification authority, wherein the alteration request comprises the registration identification associated with the device;
   mutually authenticating the device and the upgrade server based on the assigned certificates and the registration identification associated with the device;
   causing the device and the upgrade server to exchange a session key during the mutual authenticating; and
   providing the alteration from the upgrade server to the device using the session key exchanged during the mutual authenticating.

2. The method of claim 1, wherein the alteration is an upgrade.

3. The method of claim 1, wherein the alteration is a downgrade.

4. The method of claim 1, wherein:
   the alteration is downloaded to a secure partition of the device, wherein the alteration is decrypted and verified using the session key and at least one signature verification key for the device.

5. The method of claim 1, wherein the platform component is one of a processor and a core in a multi-core processor.

6. The method of claim 1, further comprising:
registering the device with the provisioning server, wherein the provisioning server generates the registration identification associated with the device upon successful authentication.

7. The method of claim 1, wherein the platform component is one of the following: a discrete or integrated hardware component on the device, or a firmware or software component on the device.

8. The method of claim 1, wherein the method is performed in response to a change in a subscription level, wherein the subscription level defines a component upgrade level and periodic price to be paid for performance matching the component upgrade level.

9. A method for securely altering a platform component, comprising:
generating, by an upgrade manager associated with a device, encryption and digital signature key pairs for the device, wherein the device includes the platform component;
obtaining public encryption and signature verification keys for a provisioning server from a certification authority;
mutually authenticating the device and the provisioning server using the public encryption and signature verification keys for the provisioning server and the device, wherein the provisioning server generates a registration identification associated with the device;
contacting, by the upgrade manager, the certification authority for assigned certificates for public encryption and signature verification keys for the device;
contacting, by the upgrade manager, the certification authority for assigned certificates for public encryption and signature verification keys for an upgrade server, wherein the upgrade server comprises a secure alteration for the platform component;
sending an alteration request from the upgrade manager to the upgrade server, causing the upgrade server to obtain assigned certificates for public encryption and signature verification keys for the upgrade manager from the certification authority, wherein the alteration request comprises the registration identification associated with the device;
mutually authenticating the device and the upgrade server based on the assigned certificates and the registration identification associated with the device;
causing the device and the upgrade server to exchange a session key during the mutual authenticating; and
providing the secure alteration from the upgrade server to the device via the upgrade manager using the session key.

10. The method of claim 9, wherein:
the secure alteration is downloaded to a secure partition of the device, wherein the secure alteration is decrypted and verified using the session key and at least one signature verification key for the device;
the provisioning server generates the registration identification associated with the device upon successful authentication of the device with the provisioning server; and
the platform component is altered on-demand and in-field.

11. The method of claim 9, wherein the method is performed in response to a change in a subscription level, wherein the subscription level defines a component upgrade level and periodic price to be paid for performance matching the component upgrade level.

12. A system comprising:
a device comprising a platform component;
an upgrade manager;
a certification authority;
a provisioning server; and
an upgrade server comprising an alteration for the platform component;
wherein the upgrade manager is configured to:
generate encryption and digital signature key pairs for the device;
obtain public encryption and signature verification keys for the provisioning server from the certification authority;
perform one side of mutual authentication between the device and the provisioning server using the public encryption and signature verification keys for the provisioning server and the device;
contact the certification authority for assigned certificates for public encryption and signature verification keys for the device;
contact the certification authority for assigned certificates for public encryption and signature verification keys for the upgrade server;
send an alteration request from the upgrade manager to the upgrade server, causing the upgrade server to obtain assigned certificates for public encryption and signature verification keys for the upgrade manager from the certification authority, wherein the alteration request comprises a registration identification associated with the device;
perform one side of mutual authentication between the device and the upgrade server based on the assigned certificates and the registration identification associated with the device;
send a session key to the upgrade server; and
receive the alteration from the upgrade server to the device using the session key;
wherein the certification authority is configured to:
provide the encryption and signature verification keys for the provisioning server to the upgrade manager;
assign certificates for public encryption and signature verification keys for the device; and
assign certificates for public encryption and signature verification keys for the upgrade server;
wherein the provisioning server is configured to:
perform the other side of mutual authentication between the device and the provisioning server using the public encryption and signature verification keys for the provisioning server and the device; and
verify device information for the device; and
wherein the upgrade server is configured to:
obtain assigned certificates for public encryption and signature verification keys for the upgrade manager from the certification authority;
perform the other side of mutual authentication between the device and the upgrade server using the public encryption and signature verification keys for the upgrade server and the device;
exchange the session key with the upgrade manager; and
send the alteration to the upgrade manager using the session key.

13. The system of claim 12, wherein the upgrade manager is located on the device.

14. The system of claim 12, wherein the device further comprises:
a secure partition including a secure key store, a secure data store, and native cryptographic functions;

wherein the alteration is downloaded to the secure partition for decryption and verification using the session key and at least one signature verification key.

15. The system of claim 14, wherein the native cryptographic functions include:
   a random number generator;
   a hash generator;
   a cryptographic key generator; and
   a digital signature and encryption/decryption engine.

16. The system of claim 14, wherein the secure partition is only accessible in a privileged mode.

17. The system of claim 16, wherein the device further contains a secure monitor designed to determine if the device is in a privileged mode.

18. A system for securely altering a platform component, comprising:
   an upgrade manager configured for:
      generating encryption and digital signature key pairs for a device associated with the upgrade manager, wherein the device includes the platform component;
      obtaining public encryption and signature verification keys for a provisioning server from a certification authority;
      mutually authenticating the device and the provisioning server using the public encryption and signature verification keys for the provisioning server and the device;
      contacting the certification authority for assigned certificates for public encryption and signature verification keys for the device;
      contacting the certification authority for assigned certificates for public encryption and signature verification keys for an upgrade server, wherein the upgrade server comprises a secure alteration for the platform component;
      sending an alteration request from the upgrade manager to the upgrade server, causing the upgrade server to obtain assigned certificates for public encryption and signature verification keys for the upgrade manager from the certification authority, wherein the alteration request comprises a registration identification associated with the device;
      mutually authenticating the device and the upgrade server based on the assigned certificates and the registration identification associated with the device;
      causing the device and the upgrade server to exchange a session key during the mutual authenticating; and
      providing the secure alteration from the upgrade server to the device using the session key.

19. The system of claim 18, wherein:
   the secure alteration is downloaded to a secure partition of the device, wherein the secure alteration is decrypted and verified using the session key and at least one signature verification key for the device;
   the provisioning server generates the registration identification associated with the device upon successful authentication of the device with the provisioning server; and
   the platform component is a computer processor.

20. A program storage device readable by a machine tangibly embodying a program of instructions executable by the machine to perform a method for securely altering a platform component, the method comprising:
   generating, by an upgrade manager associated with a device, encryption and digital signature key pairs for the device, wherein the device includes the platform component;
   obtaining public encryption and signature verification keys for a provisioning server from a certification authority;
   mutually authenticating the device and the provisioning server using the public encryption and signature verification keys for the provisioning server and the device;
   contacting, by the upgrade manager, the certification authority for assigned certificates for public encryption and signature verification keys for the device;
   contacting, by the upgrade manager, the certification authority for assigned certificates for public encryption and signature verification keys for an upgrade server, wherein the upgrade server comprises a secure alteration for the platform component;
   sending an alteration request from the upgrade manager to the upgrade server, causing the upgrade server to obtain assigned certificates for public encryption and signature verification keys for the upgrade manager from the certification authority, wherein the alteration request comprises a registration identification associated with the device;
   mutually authenticating the device and the upgrade server based on the assigned certificates and the registration identification associated with the device;
   causing the device and the upgrade server to exchange a session key during the mutual authenticating; and
   providing the secure alteration from the upgrade server to the device via the upgrade manager using the session key.

21. The program storage device of claim 20, wherein:
   the secure alteration is downloaded to a secure partition of the device, wherein the secure alteration is decrypted and verified using the session key and at least one signature verification key for the device;
   the provisioning server generates the registration identification associated with the device upon successful authentication of the device with the provisioning server; and
   the platform component is a feature of a hardware component.

22. The program storage device of claim 21, wherein the feature is hyperthreading.

23. The program storage device of claim 21, wherein the feature is virtualization technology.

24. The program storage device of claim 21, wherein the feature is remote management.

* * * * *